(12) United States Patent
Matsudo

(10) Patent No.: US 6,625,171 B1
(45) Date of Patent: Sep. 23, 2003

(54) MONITORING DEVICE FOR CPS PACKET MULTIPLEXING AND CELL ASSEMBLY CONTROL METHOD TAKING ACCOUNT OF ASSEMBLY TIME

(75) Inventor: Takayuki Matsudo, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/517,183

(22) Filed: Mar. 2, 2000

(30) Foreign Application Priority Data

Mar. 4, 1999 (JP) .......................................... 11-057021

(51) Int. Cl.[7] .................................................. H04J 3/16

(52) U.S. Cl. ...................................... 370/470; 370/474

(58) Field of Search ........................... 370/395.1, 395.3, 370/395.31, 395.4, 469, 470, 471–474, 535, 532, 537

(56) References Cited

U.S. PATENT DOCUMENTS 5,544,169 A * 8/1996 Norizuki et al. .......... 370/236.2
5,557,604 A * 9/1996 Usumi et al. ................ 370/253
5,570,361 A * 10/1996 Norizuki et al. .......... 370/395.2

OTHER PUBLICATIONS

Yoshihiro Kitamura et al., "A Proposal of Multiple–Channel Low Bit–rate Voice CLAD LSI", NTT Network Service Systems Laboratories, Technical Report of IEICE, vol. 96, No. 214, pp. 43–48, Aug. 19, 1996.

Yoshihiro Kitamura et al., "A Study of An ATM Cell Assembly Method for Low Bit–rate Voice in VTOA", NTT Network Service Systems Laboratories, IEICE, pp. 773–774, 1996.

"Standardization trend and technical issue of VTOA" Okutani Technical Report of IEICE IN96–36(Jul. 1996) pp. 35–40.

"Application of ATM to Mobile Communications Network—Technical Subjects of ATM for Low Bit Rate Voice" Tsuboya et al. Technical Report of IEICE IN96–37(Jul. 1996), pp. 41–46.

"A Study on voice–band signal processing in private ATM network" Yajima et al. Technical Report of IEICE IN96–38(Jul. 1996) pp. 47–54.

* cited by examiner

Primary Examiner—David Vincent
(74) Attorney, Agent, or Firm—Venable LLP; Michael A. Sartori

(57) ABSTRACT

A monitoring device for controlling connection-by-connection cell assembly times by monitoring the multiplexing of CPS packets and a cell assembly control method are disclosed. A cell assembler includes a multiplexing control circuit made up of a reference timer, a monitor, and a control table storing connection-by-connection control information. The monitor determines, based on a reference time fed from the reference timer, a time when a CPS packet is input via a packet receipt section for the first time. The monitor calculates a time for ending multiplexing on the basis of the control information read out of the control table and the CPS packet input time, and compares the time for ending multiplexing and the reference time connection by connection. When the time for ending multiplexing assigned to any connection expires, the monitor causes a packet multiplexing circuit to execute a preselected operation. The packet multiplexing circuit completes an ATM (Asynchronous Transfer Mode) cell for the above connection and sends it via a packet transmission circuit.

8 Claims, 4 Drawing Sheets

Fig. 4

| CONNECTION No. | ACTIVE BIT | PACKING TIME | TRANSMISSION TIME |
|---|---|---|---|
| (1) | 0 | TAT(1) | Tout(1) |
| (2) | 1 | TAT(2) | Tout(2) |
| (3) | 0 | TAT(3) | Tout(3) |
| (4) | 0 | TAT(4) | Tout(4) |
| (5) | 0 | TAT(5) | Tout(5) |
| ⋮ | ⋮ | ⋮ | ⋮ |
| (n) | 0 | TAT(n) | Tout(n) |

MONITORING DEVICE FOR CPS PACKET MULTIPLEXING AND CELL ASSEMBLY CONTROL METHOD TAKING ACCOUNT OF ASSEMBLY TIME

BACKGROUND OF THE INVENTION

1. Field of the Invention

The present invention relates to a device for monitoring multiplexing of CPS (Common Part Sublayer) packets and a method of controlling cell assembly. More particularly, the present invention relates to a method and an apparatus for controlling cell assembly times set connection by connection as in newly proposed AAL2 (ATM (Asynchronous Transfer Mode) Adaptation Layer 2).

2. Description of the Background Art

It is a common practice with an intra-corporation or similar private network to compress speech signals to be sent. ATM technologies have customarily been applied to speech communication for setting up standards capable of meeting the ever-increasing demand for efficient communication and the integration of speech and data networks.

ATM allows information to be sent at a rate as high as megabits per second. With ATM, it is possible to divide, e.g., compressed information before assembling a cell with AAL or to restore the original format of data constituting a cell with AAL. Today, four different types of AAL are available, i.e., AAL1, AAL2, AAL3/4 and AAL5 assigned to a particular kind of transmission service each. On the other hand, speech communication is effected at a rate as low as several kilobits per second and variable by speechless compression. When speeches are constructed into an ATM cell by AAL1 having a standardized protocol with a fixed transmission rate, a delay ascribable to cell assembly increases with an increase in compression rate. While some different schemes have heretofore been proposed to reduce the delay, they have some problems including a decrease in efficiency and inconstant data size left unsolved.

To assemble a cell with high efficiency, it is necessary to construct packets by adding headers of speech data and then multiplexing such packets of a plurality of channels to assemble a single composite cell (so-called mapping). AAL3/4 lacks the function of multiplexing a plurality of channels while identifying the individual connection, while AAL5 undesirably increases the overhead of a protocol and complicates processing. This is why AAL2 has been newly standardized.

In accordance with AAL2, a format is made up of a CPS-PDU (Common Part Sublayer-Protocol Data Unit) header or STF (Start Field) following an ATM header, and a CPS-PDU. A CPS packet in the CPS-PDU is made up of a three-octet CPS packet header and a variable-length payload. The variable-length payload, like an ATM cell payload, is a data unit having forty-eight octets. A plurality of CPS packets are multiplexed and mapped in the variable-length payload.

Trends and studies relating to standardization taking account of multimedia environments are discussed in Takenori Okutani "Standardization trend and technical issue of VTOA", TECHNICAL REPORT OF IEICE, IN96-36 (1996-07), pp. 35–40, Hisakazu Tsuboya "Application of ATM to Mobile Communications Network-Technical Subjects of ATM for Low Bit Rate Voice-", TECHNICAL REPORT OF IEICE, IN96-37 (1996-07), pp. 41–46, and Hisahi Usijima et al. "A study on voice-band signal processing in private ATM network", TECHNICAL REPORT OF IEICE, IN96-38 (1996-07), pp. 47–54.

While the above multiplexing and mapping is, in principle, completed within a preselected cell assembly time in order to reduce the delay, the delay sometimes increases in practice. In light of this, a cell transmitting station counts a cell delay with, e.g., a timer. When the delay exceeds a preselected value before the completion of a cell, the transmitting station fills the incomplete portion of the cell with padding and then sends the resulting partially filled cell.

In a system of the type sending an ATM cell on the elapse of a cell assembly time and the completion of multiplexing, a particular cell assembly time should preferably be assigned to each connection from the efficient CPS packet transfer and limited allowable delay standpoint. However, when the cell assembly time differs from one connection to another, it is necessary to control CPS packets by monitoring the cell assembly time connection by connection. Moreover, it is necessary to determine whether an input CPS packet is the first CPS packet or whether it is a CPS packet being multiplexed.

SUMMARY OF THE INVENTION

It is therefore an object of the present invention to provide a monitoring device and a cell assembly control method capable of controlling a cell assembly time while monitoring the multiplexing of the individual CPS packet.

In accordance with the present invention, a device for monitoring a cell assembly time of a packet multiplexing circuit which multiplexes and maps a plurality of packets received via a packet receiving circuit and each consisting of a header and user information to thereby assemble a cell having a fixed length for providing a variable-speed service, the cell being sent via a packet transmitting circuit, includes a timepiece for feeding a cell assembly start time based on a value occurring when a packet is input to the packet multiplexing circuit for the first time and a reference time of the device. An information storage stores, connection by connection, connection control information defined on a protocol layer basis and set between the same layers for indicating a relation between terminals to communicate with each other. A monitoring circuit monitors, based on the connection control information, the cell assembly start time and the reference time, a time for ending packet multiplexing connection by connection, and causes the packet multiplexing circuit to execute processing in accordance with the result of monitoring.

Also, in accordance with the present invention, a cell assembly control method for controlling a cell assembly time necessary for multiplexing and mapping a plurality of received packets each consisting of a header and user information to thereby assemble a cell having a fixed length to be sent for providing a variable-speed service begins with a step of feeding a cell assembly start time based on a value occurred when a packet is input for the first time and a reference time for cell assembly. Connection-by-connection control information defined on a protocol layer basis and set between the same layers for indicating a relation between terminals to communicate with each other are read out of an information storage. Whether or not an input packet is input for the first time is determined on the basis of activity information included in the connection control information. If the input packet is input for the first time, the activity information is updated by a value indicative of a multiplexing and mapping operation. At the same time, a time for ending multiplexing is calculated for a connection to execute multiplexing and stored in the information storage. The multiplexing and mapping operation is continued if the above decision on the input packet shows that multiplexing is under way. The time for ending multiplexing assigned to the connection executing multiplexing and the times fed at the first step are compared. If the time for ending multiplexing is reached, the activity information is updated with a value indicative of the end of the multiplexing and mapping operation and the stored in the information storage. The transmission of a cell then controlled.

BRIEF DESCRIPTION OF THE DRAWINGS

The objects and features of the present invention will become more apparent from the consideration of the following detailed description taken in conjunction with the accompanying drawings in which:

FIG. 4 shows a table listing specific connection control information included in the illustrative embodiment.

DESCRIPTION OF THE PREFERRED EMBODIMENT

Figure 1:
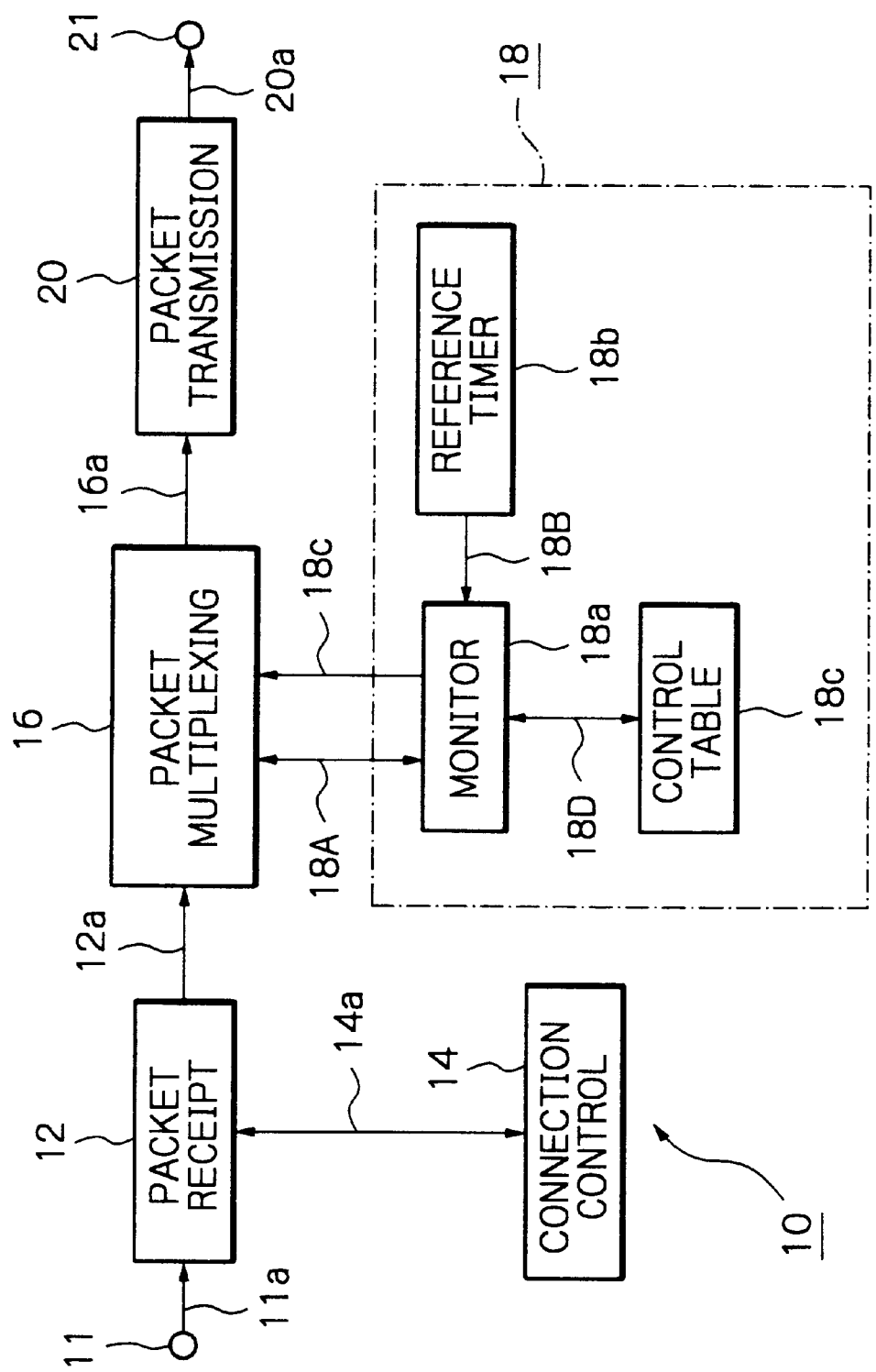
FIG. 1 is a block diagram schematically showing a cell assembler including a monitoring device embodying the present invention.

Referring to FIG. 1 of the drawings, a cell assembler to which a monitoring device embodying the present invention is applied is shown and generally designated by the reference numeral 10. Part of the cell assembler 10 not directly relevant to the understanding of the present invention is not shown in FIG. 1 and will not be described specifically. In FIG. 1, signals are designated by the same reference numerals as connection lines on which they appear.

Briefly, in the illustrative embodiment, a timer or timepiece feeds to a monitor a reference time necessary for the monitor to monitor, connection by connection, the time when a packet multiplexing circuit ends multiplexing CPS packets. The monitor can therefore see a time when the first packet is input to a packet receipt section. The monitor calculates a time for ending multiplexing by using connection-by-connection control information stored in an information storage and the reference time fed from the timepiece. The monitor them compares the above time and the reference time connection by connection. When the time for ending multiplexing expires, the monitor causing the packet multiplexing circuit to execute preselected processing. The packet multiplexing circuit transmits a multiplexed ATM cell meant for the above connection via a packing transmitting circuit. In this manner, the illustrative embodiment is capable of controlling the multiplexing time connection by connection.

The cell assembler 10 satisfies the format, process protocol and other specifications of the newly standardized AAL2 for low speed speech communication. The cell assembler 10 is generally made up of a packet receipt 12, a connection control 14, a packet multiplexing 16, a multiplexing control 18, and a packet transmission 20.

The packet receipt 12 includes a monitoring circuit for monitoring the flow rate of variable-length CPS packets fed thereto, a switch circuit, and a buffer although not shown specifically. The monitoring circuit determines whether or not CPS packets 11a input to the packet receipt 12 via an input terminal 11 exceeds the transmission capacity of channel assignment of the connection control 14. The switch circuit executes, under the control of the connection control 14, routing or classification for collecting the packets 11a connection by connection. The buffer plays the role of a conflict control memory for preventing a plurality of packets from being fed to a single connection at the same time. The packet receipt 12 delivers packets 12a collected connection by connection to the multiplexing 16.

The connection control 14 executes connection-by-connection control in accordance with control information 14a set by upper layer software beforehand, thereby controlling the operation of the packet receipt 12. It should be noted that a multiplex packing setting time, i.e., a cell assembly time (TAT) is stored in a control table 18a included in the multiplexing control 18, as will be described specifically later.

The packet multiplexing 16 sequentially multiplexes, or packs, the connection-by-connection packets 12a in the CPS-PDU of a cell from a position immediately after an ATM header and an STF. The STF includes a pointer, a modulo 2 sequence number (SN), and STF parity bits (P). When a CPS packet extends over two ATM cells, the above pointer indicates a boundary between a wrong CPS packet and a CPS packet following it. The STF serves as a CPS-PDU header at the same time. A plurality of CPS packets each having a CPS packet header and a variable-length payload are multiplexed after the STF.

The multiplexing control 18 includes a monitor 18a and a reference timer or timepiece 18b in addition to the previously stated control table 18c. The packet multiplexing 16 feeds to the monitor 18a a signal 18A representative of the input of the connection-by-connection CPS packets 12a. The reference timer 18b and control table 18c respectively feed time information 18B and information 18D to the monitor 18a. The monitor 18a calculates, connection by connection, a period of time necessary for multiplexing to end (multiplexing end time) on the basis of the information 18A and 18D, while monitoring the period of time. The monitor 18a delivers a control signal 18C to the packet multiplexing 16 in accordance with the result of monitoring.

The packet transmission 20 sends, in accordance with the control signal 18C, an ATM cell 16a assembled by the packet multiplexing 16 to destinations each being associated with a particular connection via an output terminal 21 as an ATM cell 20a.

With the above construction, the cell assembler 10 sets a particular cell assembly time for each connection and monitors it for thereby controlling the multiplexing operation.

Figure 2:
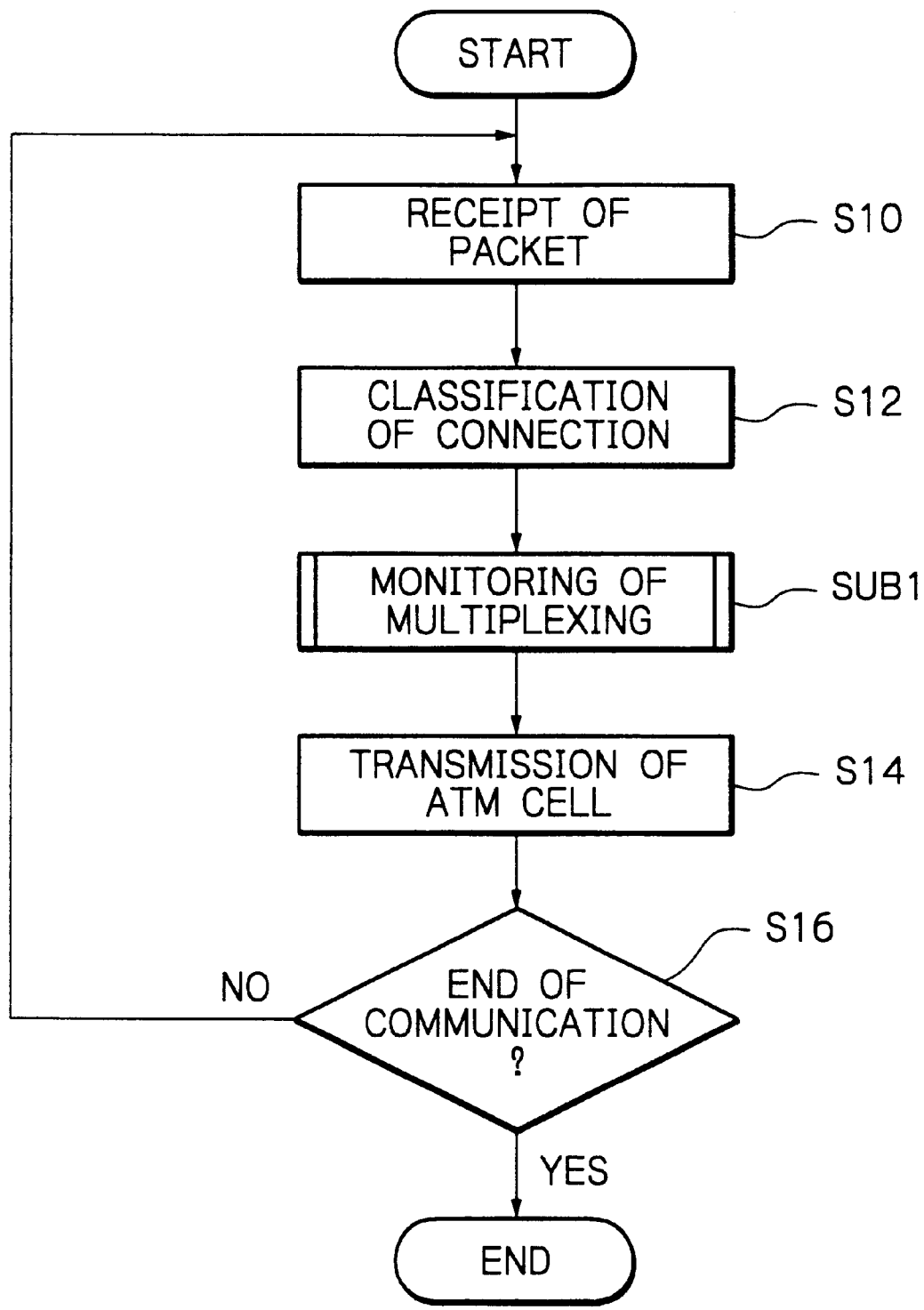
FIG. 2 is a flowchart demonstrating a main routine to be executed by the cell assembler.
Figure 3:
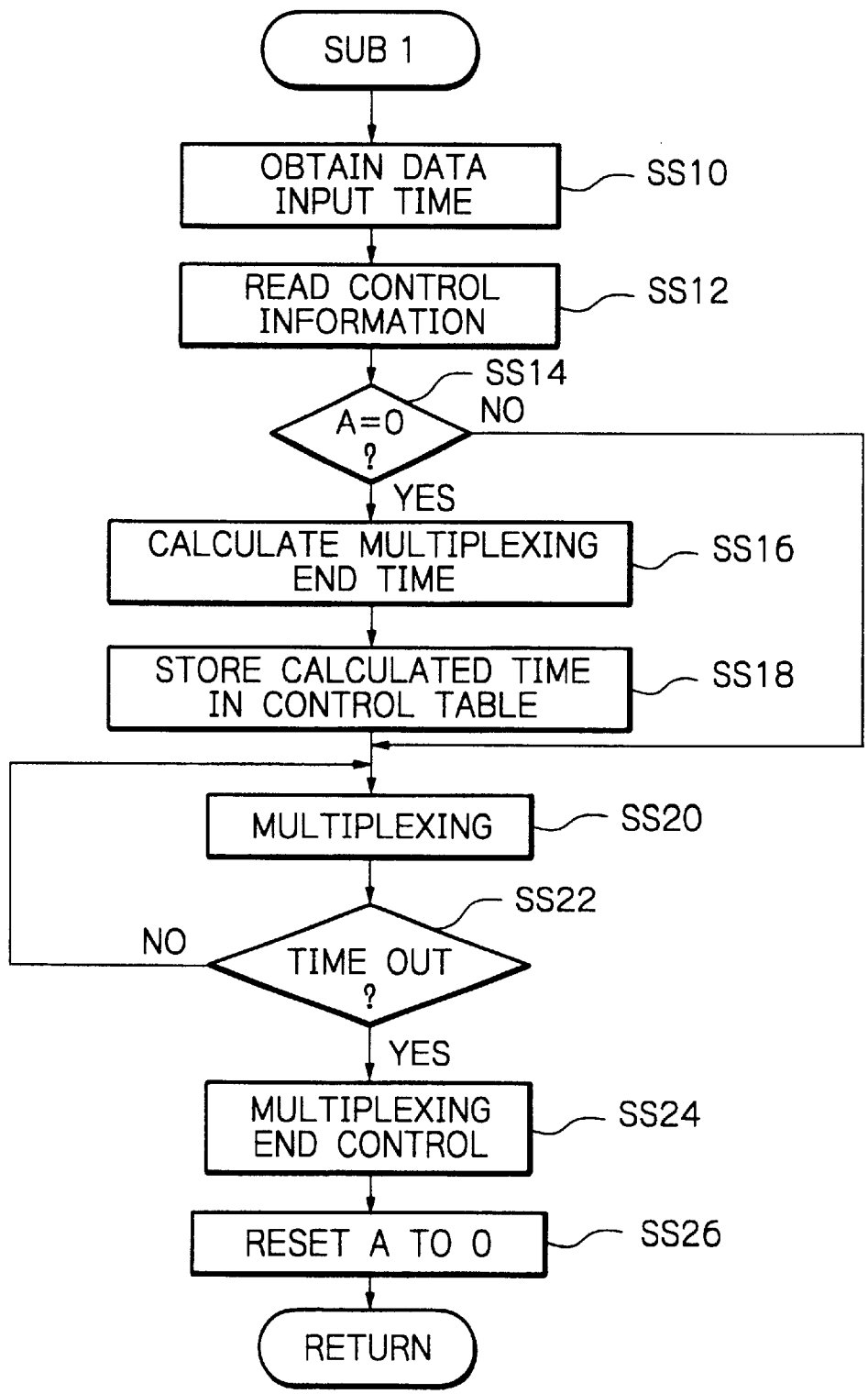
FIG. 3 is a flowchart showing a subroutine included in the main routine and unique to the illustrative embodiment.

Reference will be made to FIGS. 2 and 3 for describing a specific operation of the cell assembler 10. It is to be noted that connection control information based on ALL2 are stored in the cell assembler 10 beforehand. As shown in FIG. 2, after the cell assembler 10 has started operating, the CPS packets 11a are input to the packet receipt 12 via the input terminal 11 (step S10). A step S12 is executed immediately after the step S10.

In the step S12, the CPS packet receipt 12 executes routing control in order to classify the received CPS packets 11a by connection, i.e., to determine correspondence between the CPS packets 11a and the connections in accordance with the control signal 14a fed from the connection control 14. The resulting connection-by-connection CPS packets 12a are delivered from the CPS packet receipt 12 to the packet multiplexing 16.

In a subroutine SUB 1 following the step S12, the packet multiplexing 16 multiplexes the CPS packets 12a connection by connection. At this instant, the multiplexing control 18 monitors the duration of packing of the CPS packets 12a, i.e., a packing time connection by connection and determines, based on the result of monitoring, whether or not to end the packing operation connection by connection. To cause the packet multiplexing 16 to end packing the CPS packets 12a of a certain connection, the multiplexing control 18 sends the control signal 18C meant for the above connection to the packet multiplexing 16. In response, the packet multiplexing 16 feeds the assembled ATM cell 16a of the above connection to the packet transmission 20 and then ends the subroutine SUB1. The operation of the multiplexing control 18 will be described more specifically later. The packet transmission 20 sends the multiplexed ATM cell 16a to destinations via the output terminal 21 (step S14)

After all the connection-by-connection data have been sent from the packet transmission 20, whether the communication should be ended is determined (step S16). If new data to be sent are input to the packet receipt 12 (NO, step S16), the routine returns to the step S10, determining that the communication should be continued. If a communication end command is received (YES, step S16), the routine ends. In this manner, the cell assembler 10 is capable of controlling a freely set packing time connection by connection.

The subroutine SUB1 for monitoring the AAL2 CPS packets packing time connection by connection will be described more specifically with reference to FIG. 3. As shown, when a CPS packet 12a meant for a certain connection is input to the packet multiplexing 16, the monitor 18a reads the time information 18B output from the reference timer 18b in order to see the time of receipt of the above packet 12a (substep SS10). The time of receipt will be referred to as a data input time Tin.

Subsequently, the monitor 18a reads the information 18D stored in the control table 18c (substep SS12). As shown in FIG. 4 specifically, the information 18D at least include connection Nos. (1) through (n), logical values of an active bit A, packing times TAT (1) through TAT (n), and transmission times Tout(1) through Tout (n). The connection Nos. (1) through (n) are data indicating correspondence between the connections and the other data listed in the control table 18c.

The active bit A is a flag bit showing whether or not the associated connection is in an active status. The active status refers to a condition wherein the packet multiplexing 16 has received the first CPS packet meant for a certain connection and is about to start or continue its packing operation. The active status occurs when the active bit A is (logical) ONE (see Connection No. (2), FIG. 4). When the active bit A is (logical) ZERO, it is representative of a negative status occurring when no CPS packets 12a are input to the packet multiplexing 16 or when CPS packets 16a have been delivered from the multiplexing 16 (see Connection No. (1) and Nos. (3) through (n), FIG. 4). In addition, the negative status indicates that a CPS packet 12a is packed in the head of the payload of an ATM cell 16a. Particularly, the active bit A is representative of a position also when it is ZERO.

The packing times TAT(1) through TAT(n) each refer to a cell assembly time, i.e., a period of time over which the packet multiplexing 16 can continuously pack CPS packets input thereto after it has been brought to the active status. The packing times TAT(l) through TAT(n) are set by upper layer software beforehand and can be freely set connection by connection. The transmission times Tout(1) through Tout(n) each are a time (or a period of time) when CPS packets 12a packed into an ATM cell are sent. Stated another way, the transmission times Tout(l) through Tout(n) refer to times when the multiplexing of CPS packets 12a ends (multiplexing end times). The transmission times Tout(l) through Tout(n) are calculated by the monitor 18a, as will be described specifically later.

In the substep SS12, the monitor 18a reads an active bit A and a packing time TAT associated with the connection number as information 18D. At this stage of subroutine SUB1, a transmission time has not been determined yet.

In a substep SS14 following the substep SS12, the monitor 18a determines whether or not the active bit A is ZERO. Assume that the active bit A is ZERO (YES, substep SS14), more specifically that a CPS packet 12a corresponding to the connection number is input to the packet multiplexing 16 for the first time or that an ATM cell 16a has been sent, i.e., the multiplexing 16 is empty, as stated earlier. Then, the monitor 18a executes a substep SS16. If the active bit A is not ZERO, i.e., if it is ONE (NO, substep SS14), the monitor 18a executes a substep SS20, determining that a packing operation is under way.

In the substep SS16, the monitor 18a calculates a multiplexing end time Tout(n) for a given connection (n) by using an input time Tin of the first packet fed from the reference timer 18b and a packing time TAT(n) fed from the control table 18c:

$$\text{Tout}(n)=\text{TAT}(n)+\text{Tin}(n).$$

At the time of the above calculation, the monitor 18a changes the active bit A of the connection from ZERO to ONE. The substep SS16 is followed by a substep SS18.

In the substep SS18, the monitor 18a writes the calculated multiplexing end time and the new value of the active bit A in the control table 18c as information 18D. Subsequently, in the substep SS20, the monitor 18a causes the packet multiplexing 16 to pack, or multiplex, CPS packets 12a in the payload of an ATM cell meant for the connection. At this instant, the packet multiplexing 16 may continuously pack CPS packets 12a for a preselected period of time connection by connection or may pack CPS packets 12a meant for a single connection. The substep SS18 is followed by a substep SS22.

In the substep SS22, the monitor 18a determines whether or not the multiplexing end time has elapsed. More specifically, the monitor 18a continuously receives the time information 18B (Tscan; count or time) from the reference timer 18b on a real-time basis. At the same time, the monitor 18a is reading the transmission time of the connection whose active bit A is ONE. That is, the monitor 18a monitors only one of the connections which is currently subjected to packing.

In the specific condition of the control table 18c shown in FIG. 4, the monitor 18a compares the current time Tscan and the transmission time Tout(n) assigned to the connection No.(n) of which the active bit A is one, in turn. If the current time Tscn is short of the transmission time Tout(2) (Tscn<Tout(2)), the monitor 18a determines that the transmission time Tout(2) has not elapsed yet (NO, step SS22) and returns to the substep SS20 for continuing the packing operation. If the current time Tscn has exceeded the transmission time Tout(2) (Tscan≧Tout(2)), the monitor 18a determines that the transmission time Tout(2) has elapsed (YES, substep SS22) and then executes a substep SS24.

In the substep SS24, the monitor 18a sends a control signal 18C to the packet multiplexing 16. The control signal 18C causes the packet multiplexing 16 to stop packing the CPS packets 12a meant for the connection No.(2) and output the assembled ATM cell. Subsequently, the monitor 18a again changes the active bit A of the connection No.(2) from ONE to ZERO and sets it in the part of the control table 18c assigned to the connection No.(2) (substep SS26). In this condition, the monitor 18a is ready to pack CPS packets 12a meant for the next connection. After the substep SS26, the operation returns to the step S14 of the main routine shown in FIG. 2.

With the above procedure, the cell assembler 10 is capable of monitoring only one connection while packing CPS packets 12a meant for the connection. This is successful to obviate the erroneous recognition of the multiplexing end times of connections in which CPS packets are not input. The cell assembler 10 can therefore readily adapt to an increase in the number of ATM connections only if the capacity of a memory storing the control table 18c is increased. Further, the cell assembler 10 can transfer connection-by-connection CPS packets with improved efficiency. In addition, the cell assembler 10 enhances the freedom of cell assembly because it allows an allowable delay to be freely set connection by connection.

In summary, it will be seen that the present invention is capable of enhancing efficient connection-by-connection CPS packet transmission and promoting free cell assembly based on an allowable delay freely set connection by connection.

The entire disclosure of Japanese patent application No. 57021/1999 filed on Mar. 4, 1999 including the specification, claims, accompanying drawings and abstract of the disclosure is incorporated herein by reference in its entirely.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A device for monitoring a cell assembly time of a packet multiplexing circuit which multiplexes and maps a plurality of packets received via a packet receiving circuit and each consisting of a header and user information to thereby assemble a cell having a fixed length for providing a variable-speed service, said cell being sent via a packet transmitting circuit, said device comprising:
   a timepiece for feeding a cell assembly start time based on a value occurring when a packet is input to the packet multiplexing circuit for the first time and a reference time of said device;
   an information storage for storing, connection by connection, connection control information defined on a protocol layer basis and set between same layers for indicating a relation between terminals to communicate with each other; and
   a monitoring circuit for monitoring, based on said connection control information, the cell assembly start time and the reference time, a time for ending packet multiplexing connection by connection, and causing said packet multiplexing circuit to execute processing in accordance with a result of monitoring.

2. A device in accordance with claim 1, wherein said information storage stores, connection by connection, activity information indicative whether or not an input packet is input for the first time, a cell assembly time for which a multiplexing operation is capable of being continued, and a time for transmitting a cell.

3. A device in accordance with claim 1, wherein said monitoring circuit comprises:
   a position determining section for determining a packet position on the basis of said activity information; and
   a recognizing section for updating said activity information in accordance with the packet position determined by said position determining section, recognizing the time for ending packet multiplexing for a connection being monitored, and resetting said activity information after recognition of said time for ending packet multiplexing.

4. A device in accordance with claim 2, wherein said monitoring circuit comprises:
   a position determining section for determining a packet position on the basis of said activity information; and
   a recognizing section for updating said activity information in accordance with the packet position determined by said position determining section, recognizing the time for ending packet multiplexing for a connection being monitored, and resetting said activity information after recognition of said time for ending packet multiplexing.

5. A cell assembly control method for controlling a cell assembly time necessary for multiplexing and mapping a plurality of received packets each consisting of a header and user information to thereby assemble a cell having a fixed length to be sent for providing a variable-speed service, said method comprising the steps of:
   (a) feeding a cell assembly start time based on a value occurring when a packet is input for the first time and a reference time for cell assembly;
   (b) reading, connection by connection, connection control information defined on a protocol layer basis and set between same layers for indicating a relation between terminals to communicate with each other out of an information storage;
   (c) determining whether or not an input packet is input for the first time on the basis of activity information included in said connection control information;
   (d) updating, if the input packet is input for the first time, said activity information with a value indicative of a multiplexing and mapping operation, calculating a time for ending multiplexing for a connection to execute multiplexing, and storing said time in said information storage;
   (e) continuing the multiplexing and mapping operation if a decision made in step (c) shows that multiplexing is under way; and
   (f) comparing the time for ending multiplexing assigned to the connection executing multiplexing and the times fed in step (a), updating, if said time for ending multiplexing is reached, said activity information with a value indicative of an end of the multiplexing and mapping operation, storing said value in said information storage, and controlling a transmission of a cell.

6. A method in accordance with claim 5, wherein step (f) comprises monitoring only the connection whose activity value is indicative of the multiplexing and mapping operation.

7. A method in accordance with claim 5, wherein the time for ending multiplexing output in step (d) comprises a sum of the value occurred when a packet is input for the first time and a cell assembly time for which the multiplexing and mapping operation is capable of being continued.

8. A method in accordance with claim 6, wherein the time for ending multiplexing output in step (d) comprises a sum of the value occurred when a packet is input for the first time and a cell assembly time for which the multiplexing and mapping operation is capable of being continued.

* * * * *